Feb. 20, 1968   H. A. OLSON   3,369,365
SOLID PROPELLANT ROCKET MOTOR
Filed Oct. 18, 1965   2 Sheets-Sheet 1
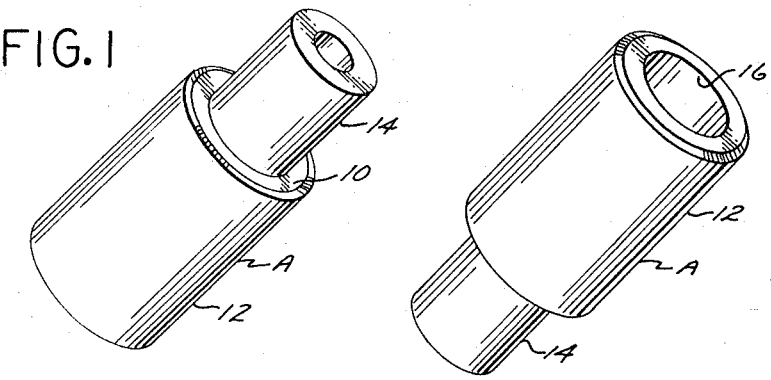
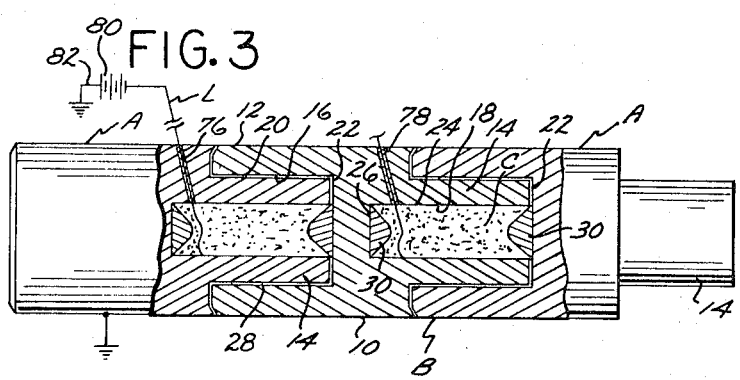
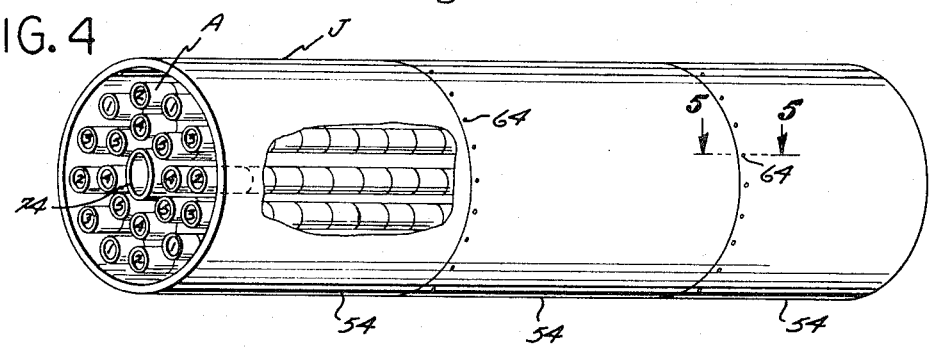
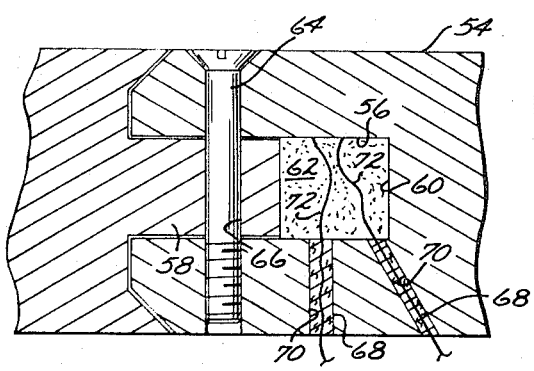
INVENTOR.
HENRY A. OLSON
BY
William G. Babcock
ATTORNEY Feb. 20, 1968 H. A. OLSON 3,369,365
SOLID PROPELLANT ROCKET MOTOR
Filed Oct. 18, 1965 2 Sheets-Sheet 2
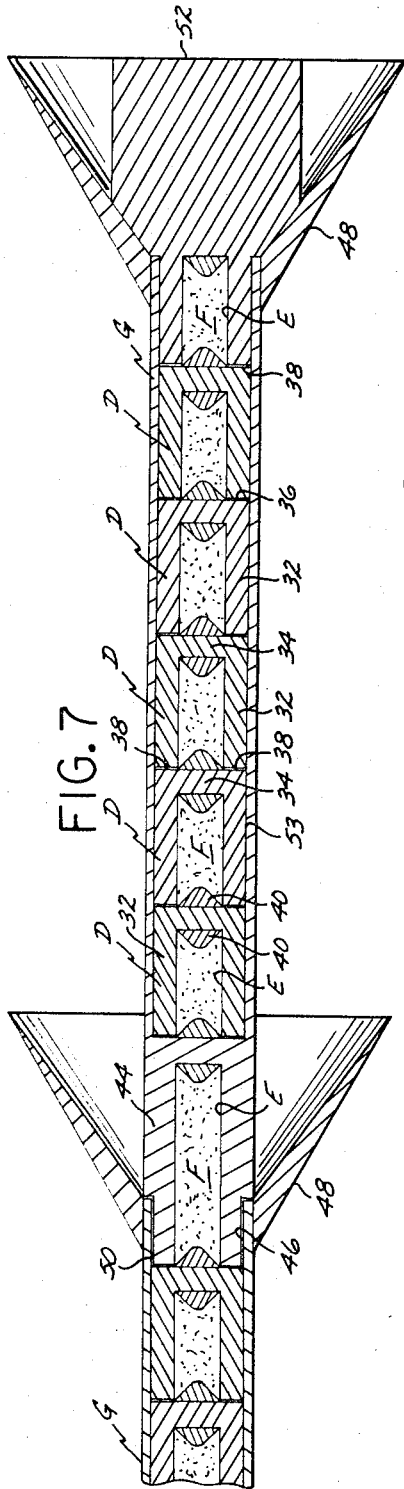
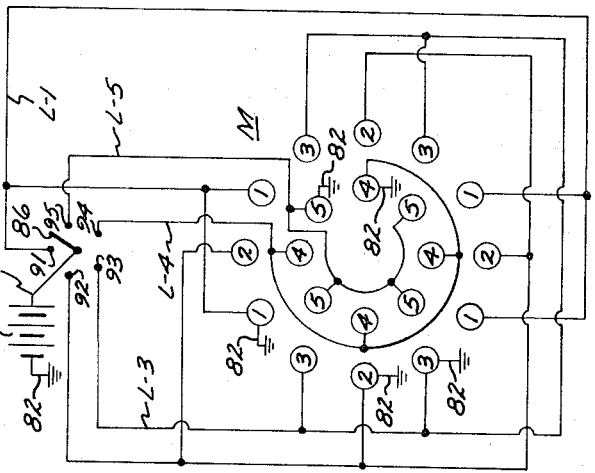
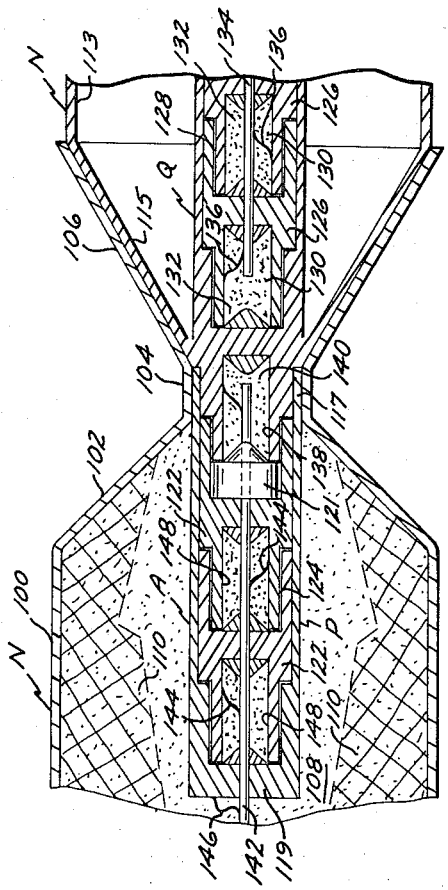
INVENTOR.
HENRY A. OLSON
BY
William C. Babcock
ATTORNEY

United States Patent Office 3,369,365
Patented Feb. 20, 1968

3,369,365
SOLID PROPELLANT ROCKET MOTOR
Henry A. Olson, 3313 Danaha St.,
Torrance, Calif. 90505
Filed Oct. 18, 1965, Ser. No. 497,096
3 Claims. (Cl. 60—225)

ABSTRACT OF THE DISCLOSURE

A solid propellant rocket motor in which a plurality of longitudinally spaced charges are consecutively fired to thrust portions of the motor rearwardly, and move that portion of the motor containing the unfired charges forwardly with increasingly greater velocity.

Cross-references to related applications

None.

BACKGROUND OF THE INVENTION

Field of the invention

The invention pertains to the field of solid propellant rocket motors.

Description of the prior art

In the past, solid propellant rocket motors have been used, but not motors in which longitudinally spaced charges of explosive are sequentially fired to forcefully move portions of the motor rearwardly to impart increased thrust and velocity to a forwardly disposed portion of the motor containing unfired explosive charges.

Summary of the invention

A solid propellant rocket motor that includes a number of telescopically engaging members which serve to define the elongate body of the motor, as well as providing longitudinally spaced enclosed chambers in which explosive charges are contained. The charges are sequentially fired, working forward from the rear of the motor. As each charge is fired, the body member rearwardly therefrom is discharged to impart increased thrust and velocity to portion of the body containing the unfired charges.

A major object of the present invention is to provide a solid propellant rocket motor in which explosion chamber-defining members are used that can be arranged in end-to-end relationship in columns or positioned in power tubes to develop a thrust of a desired magnitude when explosive charges in said members are fired in sequence.

Another object of the invention is to supply an apparatus of the nature described in which power tubes are employed of such structure that they can be arranged in a cluster or clusters in an enveloping shell, and used to impart a thrust of a desired magnitude to the shell, as well as any vehicle on which the shell is mounted, such as a sled.

A further object of the invention is to provide a solid propellant rocket motor embodying a power tube in which a number of longitudinally disposed, separate chambers are defined that contain explosive charges which may be fired in any predetermined timed sequence, which firing may be stopped and started as many times as required.

A still further object of the invention is to furnish an apparatus of the character described having a power tube in which an explosive in each chamber disposed therein actually explodes rather than burns, with the thrust to the tube being achieved by the explosive in each chamber firing a body of substantial weight rearwardly, as well as development of a forward reactive force by a rearwardly flowing stream of hot gases of combustion.

Yet another object of the invention is to provide a solid propellant rocket motor in which a series of power tubes are disposed in end-to-end relationship, each of which are provided with a divergent nozzle on the rear end thereof, which nozzles reduce the velocity of combustion gases flowing rearwardly therethrough, and each power tube and divergent section forming a part thereof is separated from those forwardly thereof when the rear power tube becomes burned out.

Another object of the invention is to provide a prime mover for rocket propelled sleds, and for propelling various types of missiles, aircraft and space vehicles.

Still another object of the invention is to supply an apparatus of the type described having a power tube in which a plurality of explosion chambers are situated that are partially defined by substantially heavy bodies which separate from the explosion chambers only after a pressure of desired magnitude has been built up in each of the chambers.

Yet a further object of the invention is to provide an apparatus of the character described, the explosion chamber-defining members of which can be fabricated from standard, commercially available materials which are simple to construct, can be stored for long periods of time without deterioration, and require a minimum of maintenance attention.

These and other objects and advantages of the present invention will become apparent from the following description of several forms thereof, and from the accompanying drawings illustrating the same, in which:

Brief description of the drawings

FIGURE 1 is a first perspective view of a first form of explosion chamber-defining member;

FIGURE 2 is a second perspective view of the apparatus shown in FIGURE 1;

FIGURE 3 is a longitudinal cross-sectional view of three of the first form of explosion chamber-defining members telescoped together to define a column;

FIGURE 4 is a perspective view of the apparatus shown in FIGURES 1–3 arranged in end-to-end relationship to define columns of thrust-producing members that are housed in parallel spaced relationship in a cylindrical shell comprised of a number of longitudinally extending sections;

FIGURE 5 is a fragmentary, longitudinal cross-sectional view of the apparatus shown in FIGURE 4, taken on the line 5—5 thereof;

FIGURE 6 is a schematic wiring diagram of an electrical circuit used in sequentially firing explosive contained in the clusters of columns shown in FIGURE 4;

FIGURE 7 is a longitudinal cross-sectional view of two power tubes in end-to-end relationship which contain a second form of explosion chamber-defining members; and FIGURE 8 is an enlarged fragmentary cross section of a missile in which the first form of explosion chamber-defining members are employed.

Description of the preferred embodiments

With continuing reference to the drawings for the general arrangements of the apparatus, it will be seen that a number of the first form of rigid explosion chamber-defining members A are provided, the detailed structure of which is shown in FIGURES 1, 2 and 8. Each of the members A includes a transverse web 10 of a predetermined geometric configuration, preferably circular, from which a first cylindrical shell 12 projects outwardly in a first direction, and a second cylindrical shell 14 projecting outwardly in a second direction, as illustrated in FIGURE 3. Shells 12 and 14 are in longitudinal alignment, and a first recess 16 extends inwardly from the outer end of the first shell. A recess 18 extends inwardly from the outer end of the second shell 14, and recess 16 is slightly larger in transverse cross section than that of second shell 14. Due to the telescoped relationship of members A, the second shell 14 is disposed in the second recess 18 adjacent thereto.

Each recess 16 is defined by a first cylindrical surface 20 and first end wall 22 in the member A of which it forms a part. Also, each second recess 18 is defined by a second cylindrical surface 24 and end wall 26 in the member A of which it forms a part. The members A are held together in the end-to-end relationship shown in FIGURES 3 and 4 by glue 28, or other bonding means which is adapted to shear or break when subjected to a predetermined force. Bonding means 28 secures each shell 14 to the surface of recess 16 most adjacent thereto (FIGURE 3).

Each surface 24 and end wall 26, together with a part of the end wall 22 rearwardly thereof, cooperatively define an explosion chamber B in which a charge of explosive C is contained, also as shown in FIGURE 3. To give the explosive charge C disposed in each chamber B a desired shape, two conical pads 30 are affixed to the first end wall 22 and second end wall 26. The use of the members A will be described in detail hereinafter.

A second form of explosion chamber-defining member D is shown in FIGURE 7, each of which is cup-shaped, defined by a cylindrical side wall 32 of substantial thickness and an end wall 34. Each side wall 32 includes a ring-shaped forward face 36 that abuts against the rear surface of the end wall 34 most adjacent thereto. Each face 36 is secured to the rear surface of the end wall 34 most adjacent thereto by glue 38, or other suitable bonding agent.

The second form of explosion chamber-defining members D are assembled end-to-end, as shown in FIGURE 7, and cooperatively define a succession of longitudinally spaced chambers E in which explosive charges F are contained. A number of rigid pads 40 of conical or other predetermined shape are provided, which are affixed to the forward and rear faces of end walls 34 to impart a desired shape to the explosive charges F in the chambers E.

A number of power tubes G are provided, which may be propelled by use of the members D previously described. In FIGURE 7 of the drawings it will be seen that each power tube G includes a cylindrical shell 42 which extends rearwardly from a first plug 44. A circumferentially extending recess 46 is formed in the forward end of each plug 44, and is engaged by the rear end of the power tube G situated directly forwardly of the plug. A diverging nozzle 48 is welded or otherwise rigidly secured to the rear external surface of each tube G. The surface defining each of the recesse 46 is secured by glue, or the like, to the engaging surface of the power tube G situated forwardly thereof. Also, an explosion chamber E is defined in each plug 44 which contains an explosive charge F.

A plug 52 of substantial weight is situated in the nozzle 48 of the rearmost power tube G, which plug is bonded to the explosion chamber-defining members A or D forwardly thereof by a film of glue 38, or other securing means. An explosive charge F is contained in an explosion chamber E located in the forward portion of plug 52.

The power tubes G may be used individually, or connected in end-to-end relationship for use in the manner shown in FIGURE 7. Whether a single power tube G or a series thereof in telescopic arrangement are employed, the charge F in explosion chamber E of plug 52 is first exploded. This explosion may be initiated by firing the charge F by electrical means to be hereinafter described.

When the charge F in plug 52 is fired, pressure is built up in chamber E until it is sufficient to rupture the glue film 38, and the plug is propelled rearwardly. However, due to the weight of plug 52, the inertia thereof is substantial, and tends to resist rapid acceleration. The rapidly increasing pressure in chamber E results in exertion of a forward force on the power tube G that propels this tube forwardly with a greater force than if the plug 52 had been light in weight. A lubricating film 53 of soapstone or the like, is preferably applied between the interior surface of the power tubes G and the second explosion chamber-defining members D positioned therein.

After firing the charge F in plug 52, those charges F forwardly thereof are fired in succession, and as each charge is exploded, one of the members D is propelled rearwardly of the power tube G in which it is located to impart a forwardly directed thrust to the power tube. The time sequence in which the charges F are fired determine the acceleration at which the power tube G will be moved forwardly. When the charge F in plug 44 is fired, the film of glue 50 is ruptured, and the power tube G to the rear thereof is separated from that power tube situated ahead of it. That power tube G forwardly of the film of glue 50 is then moving forwardly, and this movement is further accelerated by the sequential firing of the explosive charges F contained therein. When the explosive charges F in the forward power tube G (FIGURE 7) are fired, the rear power tube G has been separated therefrom, and thrust developed by the charges F in the forward tube are not partially dissipated in moving the useless weight of the rear, burned-out power tube G.

The first form of explosion chamber-defining members A are particularly adapted for stacking in end-to-end relationship to define clusters of parallel columns which are radially and circumferentially spaced within the confines of a cylindrical shell J. Shell J is formed from a number of sections 54 which are disposed in end-to-end relationship. A circumferentially extending groove 56 is formed in the forward end of each section 54 that is partially engaged by a tongue 58 formed on that section 54 that is directly forwardly thereof. When each tongue 58 and groove 56 are engaged they cooperatively define a ring-shaped chamber 60 which is adapted to contain a charge of explosive 62.

A number of circumferentially spaced bores 66 are formed in each tongue 58 which are engaged by shear pins 64. Pins 64 project through openings formed in the end portion of each section 54, located forwardly of one of the tongues 58.

One or more non-electrical conducting inserts 68 are disposed in bores 70 formed in the end portions of sections 54. Two electrical conductors 72 extend through the bores 70 and are insulated from sections 54 by the inserts 68. Conductors 72 are grounded to sections 54 after bare portions thereof pass through charges 62.

When an electric circuit is completed between one of the sections 54 and one of the electrical conductors 72, one of the explosive charges 62 is detonated whereby the shear pins 64 are fractured and the rearmost section 54 is caused to separate from the section foremost thereof. The explosion chamber-defining members A are telescoped together to form parallel columns that are radially and circumferentially separated in shell J, as can best be seen in FIGURE 4.

The columns of members A are held in the above described spacing within the confines of shell J by conventional means (not shown), such as a spider that extends between the interior surface of one of the sections 54 and a cylindrical shell 74 that is centrally disposed within the confines of the section and extends longitudinally therethrough. The columns of members A shown in FIGURE 4 are further identified by the numerals 1, 2, 3, 4 and 5 for the sake of clarity in describing the positions thereof and the manner in which they are sequentially fired to impart a forward thrust to shell J.

A transverse bore 76 is formed in each member A (FIGURE 3) which houses a core 78 of electrical insulating material. An electrical conductor L extends through each core 78 and passes through one of the charges C which is grounded to the member A that supports the core. Conductor L is connected to a source of electrical energy 80 such as a battery or the like, which battery is connected by a conductor 82 that is grounded to one of the columns of members A. In propelling the shell J, all of the explosion chamber-defining members A lying in a common transverse plane are fired before the next group of members A forwardly thereof are fired.

An electrically operated device M is shown in FIGURE 6 that can be used to successively fire all of the members A in one transverse group, and then fire the next transverse group of members A in sequence forwardly thereof. The successive firing of transverse groups of members A continues until all of these groups in a section 54 of shell J have been detonated, whereupon the charge 62 in the rear burned-out sections 54 is detonated to separate the burned-out sections from those sections forwardly thereof.

The device M includes a rotary switch referred to generally by the numeral 84 provided with a power-driven blade 86 formed of an electrically conducting material, which rotates by power means (not shown) in a counterclockwise direction to successively engage contacts 91, 92, 93, 94 and 95. Electrical conductors L–1, L–2, L–3, L–4 and L–5 extend from contacts 91–95 inclusive to the members A, further identified by the numerals 1–5 inclusive, respectively, disposed in a transverse group within the confines of one of the sections 54, as shown in FIGURE 4. Each of the members A, also identified by the numerals 1–5 inclusive, are grounded to the section 54 in which they are disposed by electrical conductors 82. Thus, when the blade 86 engages contact 91, an electric circuit is completed to detonate all of the members A, further designated by the numeral 1, lying in a common transverse group within the confines of section 54.

After the members A in one transverse group have been fired in the manner described, the blade 86 moves downwardly by means not shown and rotates over a second group of contacts 91–95 inclusive (not shown) from which conductors L–1 to L–5 respectively, extend to the next transverse group of members A forwardly of the group which has already been fired. Blade 86 continues to rotate over successive groups of contacts 91–95 inclusive until all of the transverse groups of members A in a section 54 have been fired, whereupon by means (not shown) the explosive charge 62 in the forward part of the burned-out section 54 is detonated to separate this burned-out section from those sections forwardly thereof.

Each of the explosion chamber-defining members D in each power tube G may be fired in succession by the use of the device M when modified to include an appropriate number of contacts. A number of electrical conductors L extend through electrical insulating cores 78 disposed in bores 76 formed in the power tube G and members D. The conductors L are part of an electrical circuit which includes a source of electrical energy 80 and a conductor 82 that is grounded to the power tube G.

The rear of a rocket N is shown in FIGURE 8 comprising a cylindrical shell 100 in which an inwardly and rearwardly tapering portion 102 is formed that develops into a venturi tube 104 from which a diverging nozzle 106 projects. A solid propellant 108 is housed in shell 100 that is prevented from cracking under thrust from reactive charges by a silk mesh 110 glued to the interior surface of the shell.

A second rocket N' is provided that includes a cylindrical shell 113, the forward end of which develops into a conical, inwardly tapering portion 115 that abuts against the interior surface of the nozzle 106, as shown in FIGURE 8. A power tube P is provided, and the rear portion 117 thereof is supported within the confines of the venturi tube 104. Tube P has a forwardly disposed closed end 119.

A second power tube Q is provided that is integrally joined to the second rocket portion 115 and telescopically engages the rear part 117 of the first power tube P, as also shown in FIGURE 8. A shock absorber 121 abuts against the forward extremity of the power tube Q and the rearmost of a number of explosion chamber-defining members 122 situated in the first power tube P. The explosion chamber-defining members 122 telescopically engage one another, and are bonded together by an adhesive material 124 in the same manner as the explosion chamber-defining members previously described.

The second power tube Q has a number of coaxially aligned telescopically engaged second explosion chamber-defining members 126 disposed therein which are also bonded together by an adhesive 128 in the same manner as previously described. The members 126 cooperatively define confined spaces 130 (FIGURE 8) that are each filled with charges of explosive 132. A tube 134 extends longitudinally through the second explosion chamber-defining members 126, and insulated electrical conductors are provided in this tube, each of which has a bared section 136 that is grounded to one of the members 126. The explosion chamber-defining members 126 are formed from an electrical conducting material.

By sequentially completing an electric circuit to each of the leads 136, the explosive charges 132 are fired in succession, starting at the rearmost one in the second rocket N'. As each of these charges is fired, pressure builds up in one of the spaces 130 until the adhesive 128 most adjacent thereto is ruptured, whereupon one of the explosion chamber-defining members 126 is ejected rearwardly, with a forward impulse being imparted to both the rockets N' and N. The forward end of the second power tube Q and the rear face of the shock absorber 121 cooperatively define a chamber 138 in which a charge of explosives 140 is contained. A second elongate tube 142 is provided that contains a number of insulated electrical conductors (not shown) which have bared sections 144 extending therefrom that are grounded to the first explosion chamber-defining members 122. Also, a bare conductor section 146 extends from the second tube 142 forwardly of first power tube P and is grounded to the forward extremity of the closed end portion 119.

When the charge 140 in chamber 138 is exploded, the second power tube Q, together with the shell 113 and portion 115, are ejected rearwardly and separated from the first rocket N. After this separation, the charges of explosives in chambers 148 are exploded in succession, starting at the rearmost one thereof, as the circuits to electrical sections 144 are completed. Following the firing of each charge in the first power tube P, an electric circuit is completed to section 146 to ignite the propellant or explosive 108 in the first rocket N, and as this propellant burns, pressure is exerted on the forward extremity of the first power tube P to eject the same from the venturi tube 104, with the charge 108 thereafter continuing to discharge a stream of hot gases rearwardly through the venturi tube and nozzle 106 to propel the rocket N forwardly.

To obtain a maximum forward impulse from the power tubes previously described, the adhesive used therein should shear or fracture when the force exerted by the explosive charges therein start to permanently deform the tubes in a transverse direction when detonated. Also, by lengthening the power tube, the period of time in which each rearwardly traveling explosion chamber-defining member is in the tube is increased. The greater this period of time, the more effective is the force exerted by each exploding charge.

I claim:
1. A thrust developing apparatus, including:
 (a) a plurality of rigid hollow members disposed in end-to-end relationship, each of which members in- clude a first shell having a first longitudinal recess formed therein and a second shell having a second longitudinal recess formed therein, with a transverse web supporting said recesses, and with said first recess of each of said members being snugly engaged by said second shell of the one of said members directly forward thereof, which two of said members when so engaged cooperatively define an enclosed chamber of longitudinally spaced chambers;
(b) a plurality of explosive charges in said chambers;
(c) first means for sequentially firing each of said charges starting with the rearmost one thereof and proceeding forwardly therefrom; and
(d) second means for holding each of said members to that member immediately forwardly thereof until one of said charges as it explodes exerts a predetermined force on the rear member to propel the same rearwardly and exert a forwardly directed thrust on the unseparated members.

2. An apparatus as defined in claim 1 wherein said second means comprises a layer of adhesive which bonds each of said members to that member immediately forward thereof.

3. An apparatus as defined in claim 1 wherein the rearmost of said members is of substantially greater weight than any other one of said members.

References Cited

UNITED STATES PATENTS

| | | | |
|---|---|---|---|
| 2,114,214 | 4/1938 | Damblanc | 60—225 |
| 2,476,302 | 7/1949 | Jeppson | 102—34.4 |
| 2,573,697 | 11/1951 | Dunbar et al. | 60—263 X |
| 2,654,320 | 10/1953 | Schmid. | |
| 3,088,273 | 5/1963 | Adelman et al. | 60—225 X |
| 3,142,959 | 8/1964 | Klein | 60—250 |

FOREIGN PATENTS

| | | |
|---|---|---|
| 137,341 | 9/1952 | Sweden. |

CARLTON R. CROYLE, *Primary Examiner.*